(12) United States Patent
Baudisch et al.

(10) Patent No.: US 8,620,570 B2
(45) Date of Patent: Dec. 31, 2013

(54) LOCATION-TO-LANDMARK

(75) Inventors: Patrick M. Baudisch, Seattle, WA (US); John C. Krumm, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/435,229

(22) Filed: Mar. 30, 2012

(65) Prior Publication Data
US 2012/0191336 A1 Jul. 26, 2012

Related U.S. Application Data

(62) Division of application No. 11/947,334, filed on Nov. 29, 2007, now Pat. No. 8,155,877.

(51) Int. Cl.
*G01C 21/36* (2006.01)
(52) U.S. Cl.
CPC ........ *G01C 21/3644* (2013.01); *G01C 21/3679* (2013.01)
USPC ............ 701/300; 701/532; 701/520; 701/426
(58) Field of Classification Search
USPC .......................................................... 701/300
See application file for complete search history.

(56) References Cited

U.S. PATENT DOCUMENTS

| | | | |
|---|---|---|---|
| 6,141,621 A | 10/2000 | Piwowarski et al. | |
| 6,178,377 B1 * | 1/2001 | Ishihara et al. | 701/446 |
| 6,363,161 B2 | 3/2002 | Laumeyer et al. | |
| 6,425,581 B1 | 7/2002 | Barrett | |
| 6,490,522 B2 | 12/2002 | Sugiyama et al. | |
| 6,577,950 B2 * | 6/2003 | Shimazu | 701/438 |
| 6,611,751 B2 | 8/2003 | Warren | |
| 6,728,635 B2 | 4/2004 | Hamada et al. | |
| 6,898,518 B2 | 5/2005 | Padmanabhan | |
| 7,050,903 B1 | 5/2006 | Shutter et al. | |
| 7,139,659 B2 * | 11/2006 | Mbekeani et al. | 701/117 |
| 7,269,503 B2 * | 9/2007 | McGrath | 701/117 |
| 7,307,513 B2 * | 12/2007 | Shutter et al. | 340/995.13 |

(Continued)

FOREIGN PATENT DOCUMENTS

WO   WO2005053807 A1   6/2005

OTHER PUBLICATIONS

Bidwell, "'Make it through with another point of view.' Landmarks to Wayfind in Gameworld," pp. 19-26 <<http://elivery.acm.org/10.1145/1110000/1109183/p19-bidwell.pdf?key1=1109183&key2=3089474811&coll=GUIDE&dl=GUIDE&CFID=24176057&CFTOKEN=18776917>> last accessed on Jul. 19, 2007.

(Continued)

*Primary Examiner* — Shelley Chen
(74) *Attorney, Agent, or Firm* — Lee & Hayes, PLLC

(57) ABSTRACT

A mapping application that returns results for a target location as a function of at least one nearby landmark. The one or more nearby landmarks can be selected based on an expected user familiarity with the landmark, a precision of the landmark and/or a spatial relationship of the landmark with respect to the target location. Although landmarks are an integral aspect of navigation, they have rarely been used within electronic navigation devices. Electronic navigation means for a mobile device or other devices can guide the user along a route using photographs of landmarks together with audio and text instructions that reference these landmarks. This can assist older users who often find their mobility hampered by declines in sensory, cognitive and motor abilities.

20 Claims, 9 Drawing Sheets

(56) References Cited

U.S. PATENT DOCUMENTS

| | | | |
|---|---|---|---|
| 7,774,132 B2* | 8/2010 | DeGrazia | 701/420 |
| 7,912,637 B2* | 3/2011 | Horvitz et al. | 701/33.4 |
| 2001/0007968 A1* | 7/2001 | Shimazu | 701/211 |
| 2002/0173905 A1 | 11/2002 | Jin et al. | |
| 2002/0193942 A1* | 12/2002 | Odakura et al. | 701/207 |
| 2004/0110515 A1 | 6/2004 | Blumberg et al. | |
| 2005/0240512 A1 | 10/2005 | Quintero et al. | |
| 2005/0278371 A1 | 12/2005 | Funk et al. | |
| 2005/0288859 A1 | 12/2005 | Golding et al. | |
| 2006/0064237 A1* | 3/2006 | Mbekeani et al. | 701/117 |
| 2006/0069503 A1* | 3/2006 | Suomela et al. | 701/211 |
| 2006/0089792 A1* | 4/2006 | Manber et al. | 701/207 |
| 2006/0241860 A1 | 10/2006 | Kimchi et al. | |
| 2006/0276962 A1* | 12/2006 | Yoshioka et al. | 701/208 |
| 2007/0038363 A1* | 2/2007 | McGrath | 701/117 |
| 2007/0078596 A1 | 4/2007 | Grace | |
| 2007/0110316 A1 | 5/2007 | Ohashi | |
| 2008/0046170 A1* | 2/2008 | DeGrazia | 701/202 |
| 2008/0132251 A1* | 6/2008 | Altman et al. | 455/457 |
| 2008/0140310 A1* | 6/2008 | Graef | 701/206 |
| 2008/0154488 A1* | 6/2008 | Silva et al. | 701/201 |
| 2008/0319658 A1* | 12/2008 | Horvitz et al. | 701/210 |
| 2008/0319659 A1* | 12/2008 | Horvitz et al. | 701/211 |
| 2008/0319660 A1* | 12/2008 | Horvitz et al. | 701/211 |
| 2009/0143984 A1 | 6/2009 | Baudisch et al. | |

OTHER PUBLICATIONS

Bidwell et al., "The Territory is the Map: Designing Navigational Aids," Jul. 2005, pp. 91-100 <<http://delivery.acm.org/10.1145/1080000/1073959/p91-bidwell.pdf?key1=1073959&key2=3510574811&coll=GUIDE&dl=GUIDE&CFID=24176057&CFTOKEN=18776917>> last accessed on Jul. 19, 2007.

Crowe, "A Google-Powered Map Game," Aug. 1, 2005 <<http://www.mcwetboy.net/maproom/2005/088a_googlepowered.php>> 1 page.

Findlandmarks.com <<http://www.findlandmarks.com/>> last accessed on Jul. 19, 2007, 1 page.

Great States Game—Test Your Knowledge of the USA and State Landmarks, Locations and Capitals <<http://www.learnonyourown.com/productdetails.asp?id=1898>> last accessed on Jul. 19, 2007, 3 pages.

Gueye et al., "Constraint-Based Geolocation of Internet Hosts," <<http://delivery.acm.org/10.1145/1220000/1217693/p1219-gueye.pdf?key1=1217693&key2=2250574811&coll=GUIDE&dl=GUIDE&CFID=24176057&CFTOKEN=18776917>> last accessed on Jul. 19, 2007, pp. 1219-1232.

Bidwell, "'Make it through with another point of view': Landmarks to Wayfind in Gameworld". pp. 19-26 <<http://delivery.acm.org/10.1145/1110000/1109183/p19-bidwell.pdf?key1=1109183&key2=3089474811&coll=GUIDE&dl=GUIDE&CFID=24176057&CFTOKEN=18776917>> Last accessed on Jul. 19, 2007.

Bidwell, et al., "The Territory is the Map: Designing Navigational Aids", Jul. 2005, pp. 91-100 <<http://delivery.acm.org/10.1145/1080000/1073959/p91-bidwell.pdf?key1=1073959&key2=3510574811&coll=GUIDE&dl=GUIDE&CFID=24176057&CFTOKEN=18776917>> Last accessed on Jul. 19, 2007.

Crowe, "A Google-Powered Map Game", Aug. 1, 2005 <<http://www.mcwetboy.net/maproom/2005/088a_googlepowered.php>> 1 page.

Findlandmarks.com <<http://www.findlandmarks.com/>> Last accessed on Jul. 19, 2007.

Great States Game—Test Your Knowledge of the USA and State Landmarks, Locations and Capitals <<http://www.learnonyourown.com/productdetails.asp?id=1898>> Last accessed on Jul. 19, 2007.

Gueye, et al., "Constraint-Based Geolocation of Internet Hosts", pp. 1219-1232 <<http://delivery.acm.org/10.1145/1220000/1217693/p1219-gueye.pdf?key1=1217693&key2=2250574811&coll=GUIDE&dl=GUIDE&CFID=24176057&CFTOKEN=18776917>> Last accessed on Jul. 19, 2007.

Non-Final Office Action for U.S. Appl. No. 11/947,334, mailed on Aug. 12, 2011, Patrick M. Baudisch, "Location-to-Landmark", 9 pages.

* cited by examiner

LOCATION-TO-LANDMARK

RELATED APPLICATION

This application is a divisional of and claims priority to U.S. patent application Ser. No. 11/947,334, filed on Nov. 29, 2007, the disclosure of which is incorporated by reference herein.

BACKGROUND

Mapping systems that provide direction information and location of various registered locales are commonly utilized. Map making has largely been carried out by visitors to a particular place. The knowledge of places acquired by these visitors was then aggregated and assimilated. The person with the best available knowledge of a particular area was in a superior position when it came to conquest, settlement, or trade. As the world was discovered, knowledge of its geography gradually spread to more and more people and maps improved. As technology advanced, so did the accuracy of mapmaking until arriving at what today is generally agreed upon as maps of the world.

Many location-based applications, such as yellow pages or social mobile applications use maps to communicate location to users. In contrast, maps cannot be used as part of text-based or voice-based communication, such as a Short Message Service (SMS), on a phone, or while driving. Textual addresses can be slow to perceive due to their lengths, require significant cognitive effort, and may fail if the user requesting the information is unfamiliar with the area.

When people communicate locations to each other, they often base their descriptions on mutually known landmarks. For example, people can agree to meet in a certain place or can discuss having spent the first night of their backpacking trip at "the hotel in Agra, Northern India, a mile north of the Taj Mahal".

In contrast, computer programs communicate location using more formal, canonical presentations. Global Positioning Systems (GPS) typically express location as pairs of latitude and longitude. Car navigation systems use a lookup table to translate the latitude/longitude pair into street addresses. Thus, instead of suggesting meeting at a particular place, such as in front of the Ritz Carlton, a navigation system will refer to "2801 Main St., City, State". The Indian location may turn into "XX Street, India". Unfortunately, these formal representations are often not the best way of communicating a location. First, parsing a formal address tends to take time and effort. Secondly, the communication may fail entirely if the person receiving the location information does not know the city and streets involved in the address.

Understanding a formal address requires users at the receiving end to parse the address into their own reference system. In some situations, that reference system can be a system of landmarks. Communicating a notation using the receiver's landmarks can speed up the process by bypassing this conversion. For example stating, "The conference center is located at the corner of Main Street and Third Street" typically requires more processing than "two blocks north of the conference hotel". This is also useful for navigation tasks that involve spatial relationships between the involved locations, such as the decision whether to walk or take a taxicab.

The situation where the receiver does not know the cities and streets is generally the case for unfamiliar or foreign cities. For cities with which the receiver is familiar, in many ways, cities and streets are just particular, commonly agreed on sets of landmarks. The grid layout (e.g., plus mnemonic street names, such as 5th Ave., and the use of the first two digits of a street address to indicate the cross street) used by many United States cities can make it easier to locate an address. However, street navigation in Europe and many other parts of the world requires substantial local street knowledge and therefore it can fail more often.

SUMMARY

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

In accordance with one or more examples and corresponding disclosure thereof, various aspects are described in connection with presenting locations in the form of a street address enhanced with the description based on nearby landmarks. These locations can be translated into textual descriptions based on collected landmarks, such as "between Point A and Point B" or "two blocks North of Point C". Generally, landmark-based descriptions are easier for a user to process and can be faster with respect to tasks for which only an estimate of location is necessary. Commonly known landmarks, such as tourist attractions, can be utilized as well as locations that might only be relevant to the respective user. Such relevance can be determined from address books, emails, GPS driving logs, manually entered familiarity, as well as other intrinsic or extrinsic information.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules and/or may not include all of the components and/or modules discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Figure 1:
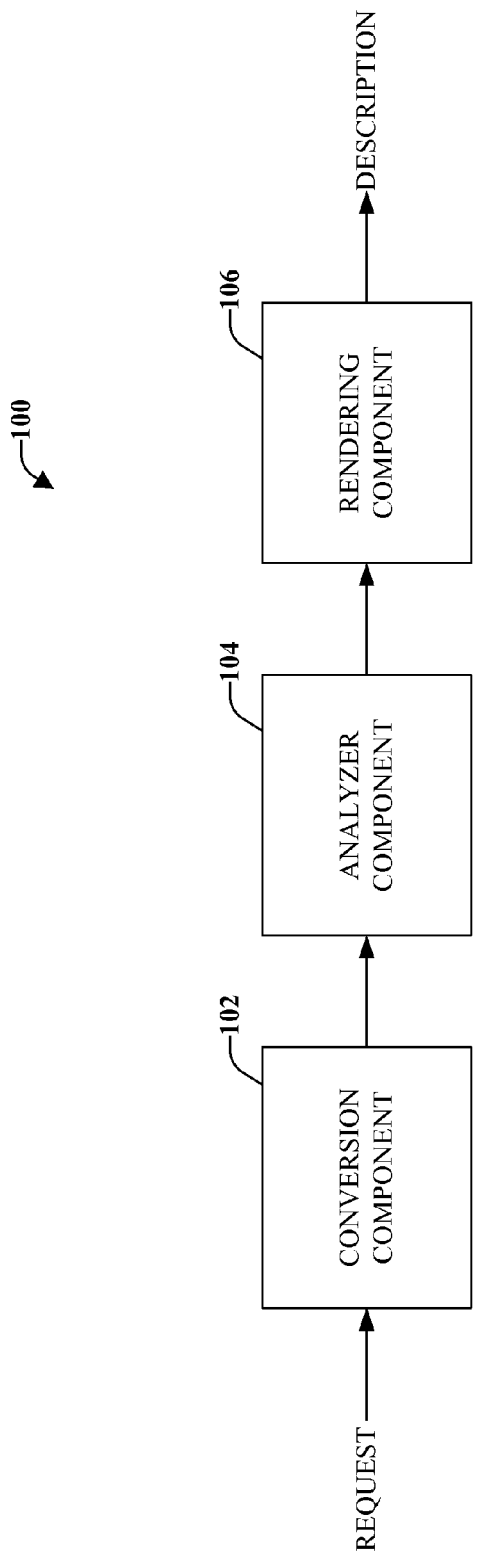
FIG. 1 illustrates a system for converting a geographic location into a landmark-based description.

Referring initially to FIG. 1, illustrated is a system 100 for converting a geographic location into a landmark-based description. In order to provide directions there should be a sense of location, which can be something that is not a direction. One manner of describing how to arrive at a particular location is to provide guidance by utilizing a number of different locations that can be described using landmarks. Many landmarks can become a subset of a direction while also maintaining individually as a landmark. Thus, a conversation can include the statement, "Let's meet at the Space Needle." This statement does not imply where each participant is located or how each participant will travel to the Space Needle. In many cases, the location or directions to get to the landmark are not needed, depending on each participant's familiarity with the area. In another example, a real estate agent might have three different properties and explain the area where each property is located by reference to a landmark. The real estate agent might say a first house is near the Space Needle, the second house is off Route 5, and the third house is on Lake Washington. Without any notion of how to get to the houses, a prospective buyer might have a sense of where each house is located and a preferred location. Thus, having a sense of where something is located and a sense of the neighborhood can be functions of a similar concept.

In further detail, system 100 includes a conversion component 102 that can be configured to receive an input, which can be a request for a location. The request can be expressed in various formats including but not limited to an address or a latitude/longitude description or other spatial coordinate. The request can also be input as a text entry, a spoken description, which can be expressed in the form of natural language, or in other formats that can be understood by system 100. The request can be received from a user and/or entity (e.g., the Internet, another system, a computer and so forth), hereinafter referred to as user.

Conversion component 102 can also be configured to translate a request into a spatial coordinate, which can be a latitude/longitude description or another type of coordinate. It is contemplated that most requests will be expressed as an address (e.g., 123 Main Avenue). At substantially the same time as the request is formatted as a spatial coordinate description, the information is conveyed to an analyzer component 104 that be configured to evaluate the spatial coordinate description and supply a landmark description, which can include multiple landmarks. The description can include a structured description of multiple lines, wherein each of the multiple lines can contain one or more landmarks. The description can also include spatial relationships between landmarks or objects. Further information relating to supplying landmark information will be provided below.

A rendering component 106 can be configured to obtain the landmark description and communicate the description into a form understandable by a receiving system (which might not be a human). The rendering component 106 can present the information in any perceivable means including visual, audio, Braille format (e.g., as a printout), and so forth. Various means of expressing the landmark description can be utilized such as a proximity relationship, imaginary intersections, or extrapolated. A proximity relationship can be expresses as in-between (or half way in-between) "A" and "B". Imaginary intersections can include visualizing that a road continues to a lake and intersects with the lake. The description can also be extrapolated, such as from "A" to "B" and then another 50 yards.

Rendering component 106 can output the information in a multitude of ways. One way is to convert the description (into text and output it as a text message. The description can be output as an SMS message. Another format of outputting the information is as a screen shot that appears as a search engine and the request is made by entering text and the output is presented as a Web page. The output can be converted to speech, such as if requested for pizza parlors, system 100 can audibly output where each pizza parlor is located. There can be some overlap because street addresses can serve as landmarks, and can be considered a subset of landmarks. If each street is considered a landmark, then each intersection can be a landmark-based description.

In accordance with some aspects, the rendering component 106 outputs the information in a modality similar to the modality that was utilized to transmit the request to conversion component 102. Thus, if the request for the location is received though a speech recognition system the output can be presented in an audio (e.g., speech) format. In accordance with some aspects, the output can be in a format that is different from the requesting format.

Rendering component 106 can also provide multiple descriptions of the same location. A first description can use multiple landmarks and a second description can be related to each landmark. Thus, useful descriptions for different users can be created. If the system 100 has knowledge about the user, it can provide a customized solution. Thus, if system 100 knows the user lives on Capitol Hill, system 100 might describe a location as compared to when the user is standing in front of Julian's, and indicate that the target location is the house to the left. If the user is not from Capitol Hill, referencing Julian's might be a less than ideal description and, thus, system 100 might output information stating that the main street is Broadway and Julian's is on the northern half of Broadway. This information is more vague can be more universally applicable.

Figure 2:
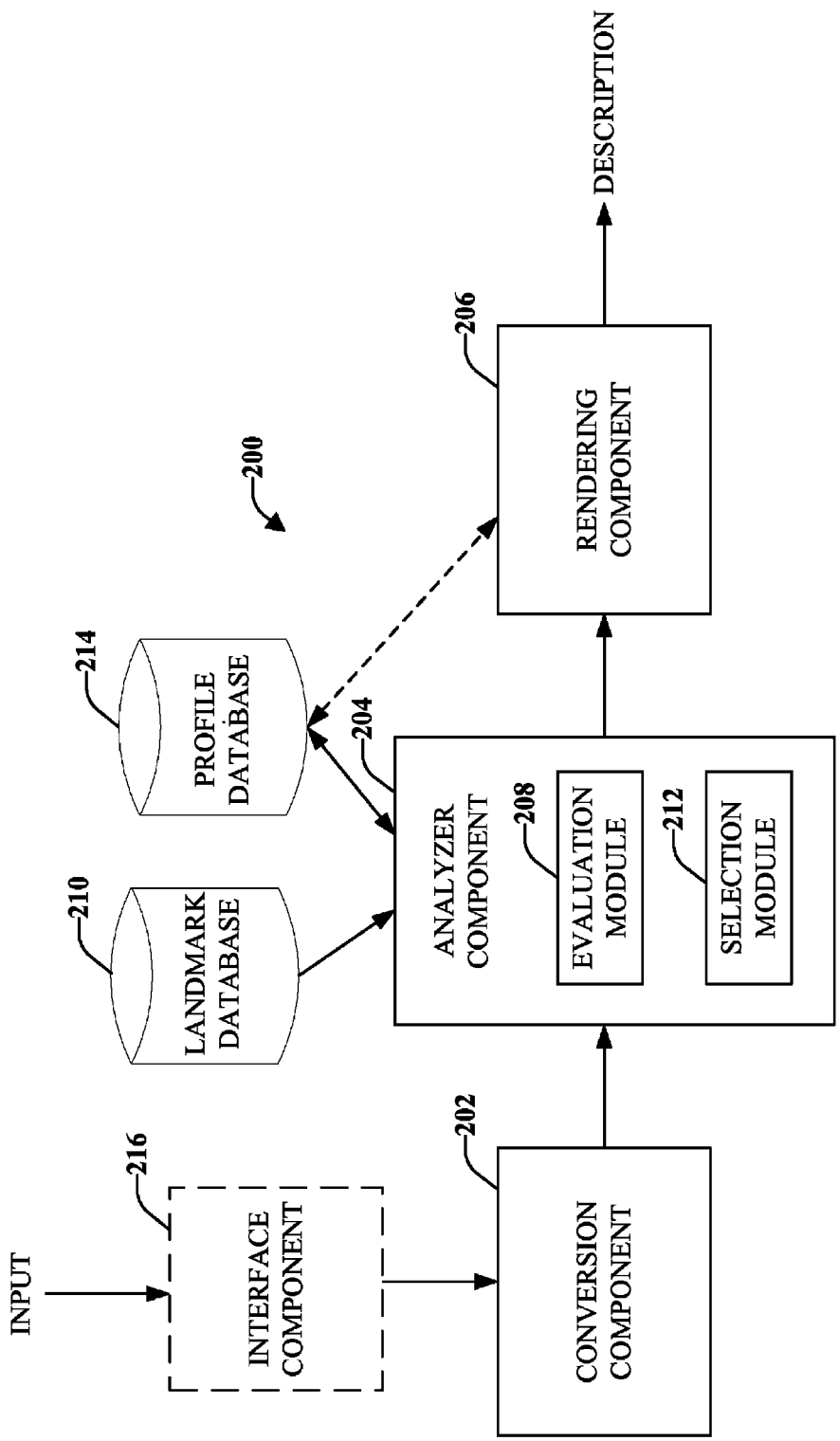
FIG. 2 illustrates a system that can convert an address or GPS location into a textual description based on nearby landmarks.

FIG. 2 illustrates a system 200 that can convert an address or GPS location into a textual description based on nearby landmarks. System 200 can be configured to present a short text or other perceivable description of the location. A text description can appear on a screen or display of a user device, such as on a cell phone. In accordance with some aspects, system 200 can be configured to convert text to speech and to present the output as audio.

System 200 includes a conversion component 202 that can be configured to accept an input for a target location, which can be expressed in various formats. For example, inputs can be entered as an address, a latitude/longitude description or other spatial coordinate, or simply by a user selecting a location on a map, such as by clicking the location with a mouse or other pointing/selecting device. The input can be a request for directions to the specified location, map selected area or other input data. Conversion component 202 can be configured to transform the input information into a spatial coordinate. If the input is a selection on the map, it can be input as a selection expressed in the form of a spatial coordinate.

The spatial coordinate description is conveyed to an analyzer component 204 that can be configured to convert the description and express the target location as a function of landmarks. The landmark description is output through a rendering component 206 in a readily perceivable format.

In further detail, analyzer component 204 can include an evaluation module 208 that can be configured to compare the target location included in the request with one or more nearby landmarks. The nearby landmarks can be determined based on information obtained from a landmark database 210. The landmark database 210 can be populated and each landmark can be annotated based on a determined popularity, which can represent a probability that a user will know that landmark. In accordance with some aspects, the popularity can be with respect to a certain user group or a class to which the user belongs (e.g., taxi driver, pizza delivery person, tourist).

Analyzer component 204 can also include a selection module 212 that can be configured to select one or more of the nearby landmarks. Where a landmark should be used as a reference depends on several factors, the sum of which can be approximated with a single scalar impact radius, which can include how familiar a user might be with a landmark, the complexity of a spatial relationship of the landmark with respect to a location, and the precision of a landmark.

In accordance with some aspects, evaluation module 208 can be configured to compare at least two nearby landmarks included in landmark database 210. Selection module 212 can be configured to choose one of the at least two nearby landmarks as a function of a distance between the landmark and the target location.

In accordance with some aspects, the landmark can be selected based on the user's familiarity with the area, which can be determined based on information obtained from a user profile database 214. By comparing the information from the user profile database 214 and the information from the landmark database 210, selection module 212 can determine the location specificity that should be presented to the user through rendering component 206. If the user is familiar with an area, a general landmark can be utilized, such as near Lake Tahoe. However, if a user is not familiar with an area or the familiarity cannot be determined, a more specific landmark or a more popular landmark can be utilized.

The information contained in profile database 214 can be obtained through various means, both intrinsic and extrinsic. Examples of intrinsic information can include, but are not limited to, information manually input by the user such as in response to query information to initialize system 200. Other examples of intrinsic information are ZIP code information, area code, city and so forth that might have been provided when system 200 or device utilizing system 200 is registered. Examples of extrinsic information include but are not limited to data observed from the surroundings, such as GPS location information.

In accordance with some aspects, selection module 212 can select at least one of the nearby landmarks by comparing two or more nearby landmarks contained in landmark database 210. The landmark can be chosen as a function of the distance between the landmark and the target address location. Alternatively or additionally, selection module 212 can select one or more of the nearby landmarks as a function of a precision of at least one of the described landmarks. In accordance with some aspects, the nearby landmark is selected based on an impact radius.

The familiarity of a landmark with respect to a user can be represented as a number between zero and one that represents an estimate of the chance of the user knowing a particular landmark. If sampled across many users, familiarity is the percentage of users who are aware of the landmark. In accordance with some aspects, familiarity can be measured with respect to a sub-community of users, rather than with respect to all users. Sub-communities that can be distinguished can include local residents compared to tourists, men compared to women, age groups, interests and other demographic information.

Figure 3:
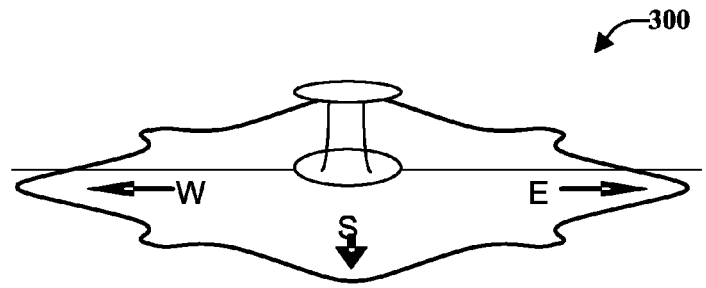
FIG. 3 illustrates an outline of impact radius that is deformed to a non-round shape.

In determining the complexity of spatial relation(s) of one or more landmarks with respect to a location, collocated can be utilized and might be easier to understand. Thus, "north", "south", "east" or "west" can be easier to understand than "northeast". A block along a street can be easier to understand than if there is no street. Two blocks North can be easier to understand than a block North and a block east. North of one location can be easier to understand then between two locations (which the user both has to know and mentally retrieve). FIG. 3 illustrates how this can affect the outline of impact radius and deforms the outline to a non-round shape 300. Thus, the outline of an impact radius may not be a circle, because "3 blocks straight south" is easier to explain than "2 blocks south, one east".

The precision of a landmark depends on its physical size and indicates how precisely the physical size assists in locating the landmark's location. An idealized spot-shaped landmark can allow for precise location at a multitude of scales. Actual landmarks have non-zero sizes. A landmark can occupy a surface, a line, a dot and so forth. A street or highway is long, but thin, so it informs only one-dimension. Descriptions based on the Seattle Center, for example, which measures an area of about six city blocks by six city blocks cannot be more accurate than six city blocks by six city blocks. Descriptions using a part of the Seattle Center, such as "The north side of the Seattle Pacific Center" or "The northeast corner of the Seattle Center" allow for a description that is more precise and can therefore be used in "zoomed in" descriptions. Edges and corners can be considered sub-landmarks of a larger landmark. Other examples are lakes and public gardens. When combining multiple one-dimensional or two-dimensional landmarks, a measurement can be made to determine if the landmarks are redundant or complement each other.

The concepts of familiarity, complexity of a spatial relationship and precision can be utilized as an aggregation function. The relevance of a landmark can be defined with respect to a specific location as:

$$\text{Relevance}(\text{landmark},\text{location}):=f(\text{distance},\text{familiarity},\text{precision},\text{complexity})$$

Similarly, the relevance of a street address can be defined by computing the relevance for the two intersecting streets, which are one-dimensional landmarks. The intersecting streets can be evaluated with the function as described above. The resulting relevance can serve as a cutoff or threshold. A landmark-based description can be used if it is at least as relevant as the street address. Otherwise, system 200 can simply output the street address.

For a given location, descriptions can be generated using any landmark on the map with the impact radius assisting in narrowing down the search. To narrow the search further, heuristics can be utilized to compute tradeoffs. However, in some cases heuristics are not utilized. For example the tradeoff between distance and familiarity of the landmark is one that might not be resolved because, in order to resolve the tradeoff, the level of experience the user has with the area (e.g., what level of description the user is interested in) has to be known. Since asking an additional question means additional user effort, it can be left out and instead all possible answers can be provided. A set of descriptions can be generated, top down starting with one landmark on the highest level and then down one landmark per level. If the description quality of one level is clearly outranked by its neighbors ("a block north of the space needle and two blocks east of Starbucks"), the weaker one can be left out, here the Starbucks reference.

Rendering component 206 can be configured to present the landmark information in response to the location request. The information can be presented by describing the relationship of two or more landmarks. Rendering component 206 can also present the description as a spatial relationship between the nearby landmark and the target location.

The information can be presented in any perceivable means. Sometimes a user does not have access to a screen or display, such as when the user is in a driving situation. In such situations, the information can be converted to speech and presented to the user through a speaker. In accordance with some aspects, the information can be communicated as part of a web page, a SMS message, a text-based service, or combinations thereof In some aspects, the information can be presented as results on a map wherein the map is populated with the landmarks that are relevant. The map can graphically illustrate the spatial relationship between the landmark and the target location. Thus, the map can be populated with landmarks and the user can determine the spatial relationship based on the underlying map geometry, which can also be used to show the meaningful relationship between points or locations. In accordance with some aspects, system 200 can choose one, two, three or more meaningful landmarks and use the map as the output device. Rendering component 206 can also output the information to another database such as in a machine-readable format. In some aspects, a separate component can be utilized to render the results as a visual, audio or other perceivable format such as Braille, for example.

Rendering component 206 can further output the information in a format based on a user preference, which can be obtained from profile database 214. Based on the preference information, the manner in which the information is output can be different from the manner in which the request was received. For example, a user may request a location by selecting a point on the map, however, the user might have requested that the result of the request be presented in a speech or audio format.

System 200 can provide an interface component 216 to allow input of the requested information. For example, interface component 216 can be an application program interface (API). As known, APIs facilitate building software applications through a set of routines, protocols, and tools, wherein developers and/or programmers can employ the API to construct customized applications consistent with the operating environment and a user(s) needs. Employing common APIs reduces learning curves and enables developers and/or programmers to focus on business needs. An API can also allow integrating location to landmark into existing location-based services.

Figure 4:
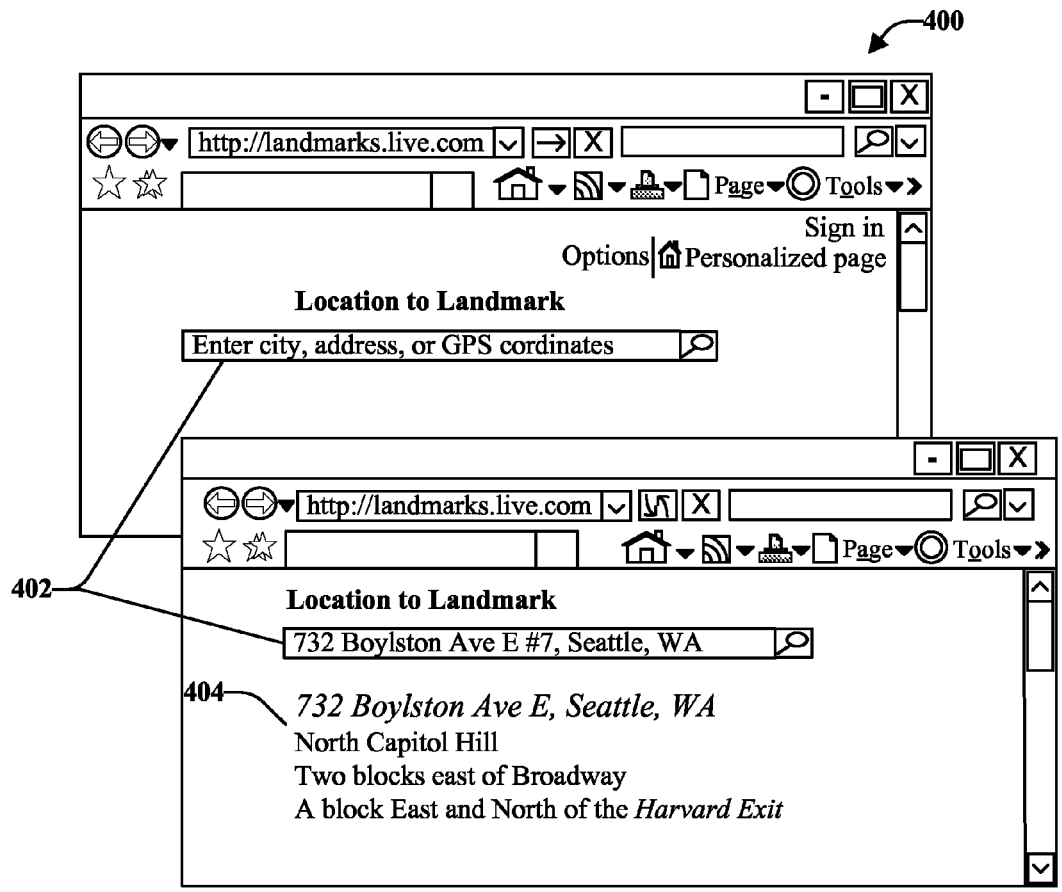
FIG. 4 illustrates an exemplary textual demo user interface.

In accordance with some aspects, interface component 216 can be a textual demo user interface 400, as illustrated in FIG. 4. A user can operate this interface 400 similar to a search engine. For example, a user can type or paste a street address or GPS location into a text box 402 and receive a landmark-based description 404 in response. It should be understood that the user interface 400 illustrated is exemplary and other interfaces, layouts, and/or formats can be utilized with the disclosed aspects.

Figure 5:
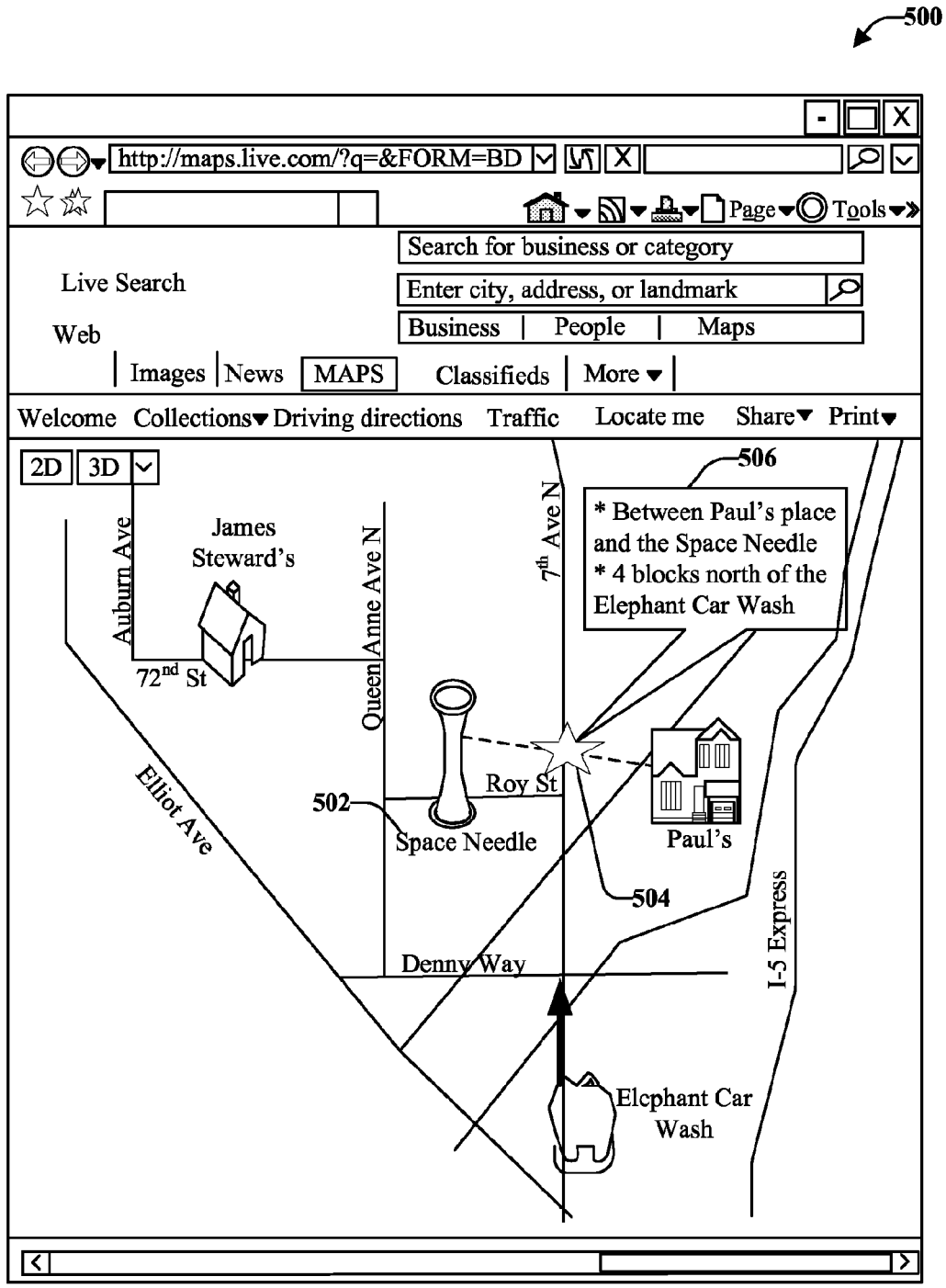
FIG. 5 illustrates an exemplary graphical demo user interface that can provide interactive demonstrations.

FIG. 5 illustrates an exemplary graphical demo user interface 500 that can provide interactive demonstrations. A user places a location marker by clicking anywhere on the map. The textual description is shown in a callout, which can be a single line or displayed in other manners. The textual description can be presented as a callout 502. Although the callout 502 is illustrated as a single line, it can be presented as multiple lines or other formats. The input location can be marked with a star 504 or other geometric figure, it can be a different color or size than other locations on the map, or it can be distinguished from other locations in some other manner. In reply to the request, the system provides a text bubble 506 with the same description the text interface would have returned. In addition, in this example, the system revealed the landmarks used in the descriptions.

Users can explore the space of descriptions by dragging location markers around. The system then updates the callout with the textual descriptions in real time. Real-time performance can be obtained by pre-computing an association between locations and landmarks.

The purpose of location-to-landmark, however, is to assist as a service to applications and services providing location information. An interface to the system can be text-in text-out. The service sends an address or spatial coordinate as a given parameter to a common repository. A Web server can return an XML file that contains the textual landmark-based description. A directory service or social mobile application, for example, may route or interface its address service through a location-to-landmark system, such as system 200. This can occur transparently for the user and the only difference the user might notice is that the directory service now offers a "friendly" description for the location.

With reference again to FIG. 2, the interface component 216 can provide a graphical user interface (GUI), a command line interface, a speech interface, Natural Language text interface, and the like. For example, a GUI can be rendered that provides a user with a region or means to request a location and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed.

The user can also interact with the regions to select and request information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed embodiments are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 6:
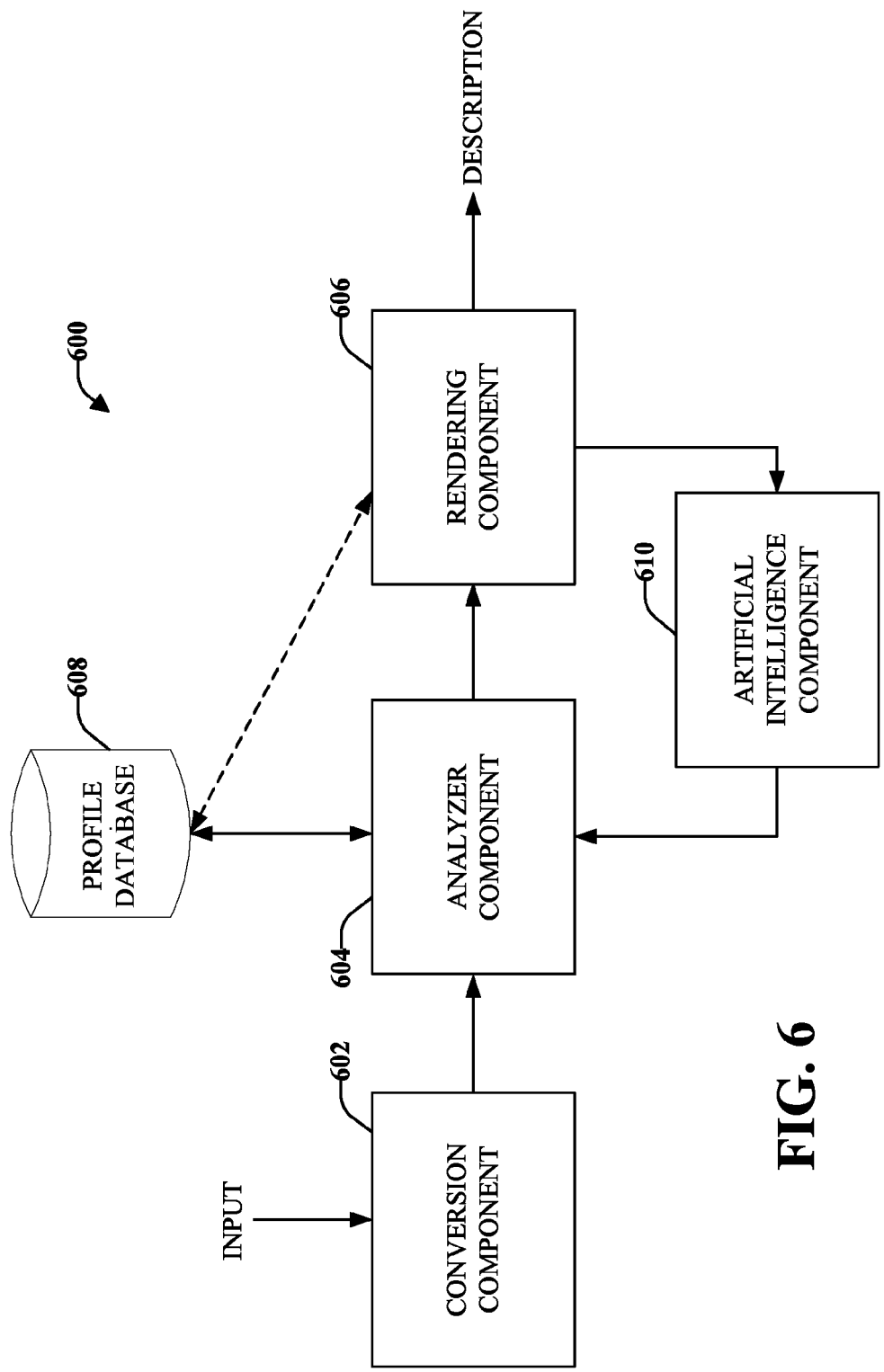
FIG. 6 illustrates a system that employs artificial intelligence to facilitate automating one or more features in accordance with the disclosed aspects.

With reference now to FIG. 6, illustrated is a system 600 that employs artificial intelligence to facilitate automating one or more features in accordance with the disclosed aspects. System 600 includes a conversion component 602 that can be configured to accept an input that includes a request for information relating to a target location. Conversion component 602 can transform the request to a spatial coordinate description and communicate the spatial coordinate description to an analyzer component 604 that can select one or more landmarks to be utilized to explain the locality of the target location. The information relating to the one or more landmarks can be presented in any perceivable format by rendering component 606. A profile database 608 can be utilized to determine a user's familiarity with an area and/or a desired format for outputting the information An artificial intelligence component 610 can utilize the profile information and match the user with the profile, allowing system 600 to further customize the output. Artificial intelligence component 610 can learn, based on past usage or based on where the user lives, works, a current GPS location and so forth and use such information to customize the output. Thus, selected information from rendering component 606 can be fed-back through artificial intelligence component 610 to analyzer component 604. Based on the feedback, analyzer component 604 can update one or more selected landmarks or other criteria that is to be output to the user.

In accordance with some aspects, rendering component 606 can provide various resolutions based on the type of location that needs to be described. If a house is to be described, system 600 can output that the house is "1 block north of the Space Needle." If a user's hometown is to be described to someone that lives in China, system 600 might return that it is in the central part of the U.S. Thus, the resolutions can vary with what is being described and the user to whom it is being described. Thus, the start resolution should be determined and the user's knowledge that can be used as a starting base. If the user's knowledge is not known, every available landmark can be presented and the user can chose to ignore those landmarks not of interest.

It should be noted that each description of a target location can result in multiple descriptions, each of which might use one or more landmarks. Thus, a description can re-use a landmark that was used in a previous description. For example, "One block north of the Space Needle" and "Halfway between the Space Needle and Key Arena" are two different descriptions that can re-use a landmark.

User familiarity can be learned by artificial intelligence component 610 by instructing rendering component 606 to provide a high-level resolution to the user and observe the actions as the user drills into the information in a progressive manner. Certain parts of the explanation (e.g., landmarks) might be previously collapsed and explored by the user on demand. Thus, if the user is searching for pizza parlors, system 600 can return three places, wherein one of the places is next to Julian's. It the user does not understand, the user can select or request more information and system 600 can describe the location in more detail. If the user still does not understand, a request for more information can be received and system 600 can continue to describe the location if more detail. Thus, artificial intelligence component 610 can determine how familiar a user is with a location based on user chosen locations and/or requested detail level.

The various embodiments (e.g., in connection with providing landmark information to express a location) can employ various artificial intelligence based schemes for carrying out various aspects thereof. For example, a process for determining if a particular user is familiar with an area or has previously visited an area can be facilitated through an automatic classifier system and process. Moreover, where multiple landmarks are employed having the same or similar resources, the classifier can be employed to determine which landmark to employ in a particular situation.

Landmarks can also be chosen based on data about the landmarks. Thus, concepts of familiarity might be a learned function based on the type of landmark or other information known about the landmark. For example, gas stations might be generally more familiar than chiropractors.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of landmark systems, for example, attributes can be words or phrases or other data-specific attributes derived from the words (e.g., landmark names, the presence of key landmarks), and the classes are categories or areas of interest (e.g., levels of priorities).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more embodiments can employ classifiers that are explicitly trained (e.g., through a generic training data) as well as implicitly trained (e.g., by observing user behavior, receiving extrinsic information). For example, SVM's are configured through a learning or training phase within a classifier constructor and feature selection module. Thus, the classifier(s) can be used to automatically learn and perform a number of functions, including but not limited to determining according to a predetermined criteria when to present a particular landmark, which stored landmarks to execute, etc. The criteria can include, but is not limited to, the amount of landmarks to be presented, the type of landmark, the importance of the landmark, etc.

Artificial intelligence based systems (e.g., explicitly and/or implicitly trained classifiers) can be employed in connection with performing inference and/or probabilistic determinations and/or statistical-based determinations as in accordance with one or more aspects as described herein. As used herein, the term "inference" refers generally to the process of reasoning about or inferring states of the system, environment, and/or user from a set of observations as captured through events, sensors, and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject embodiments.

Figure 7:
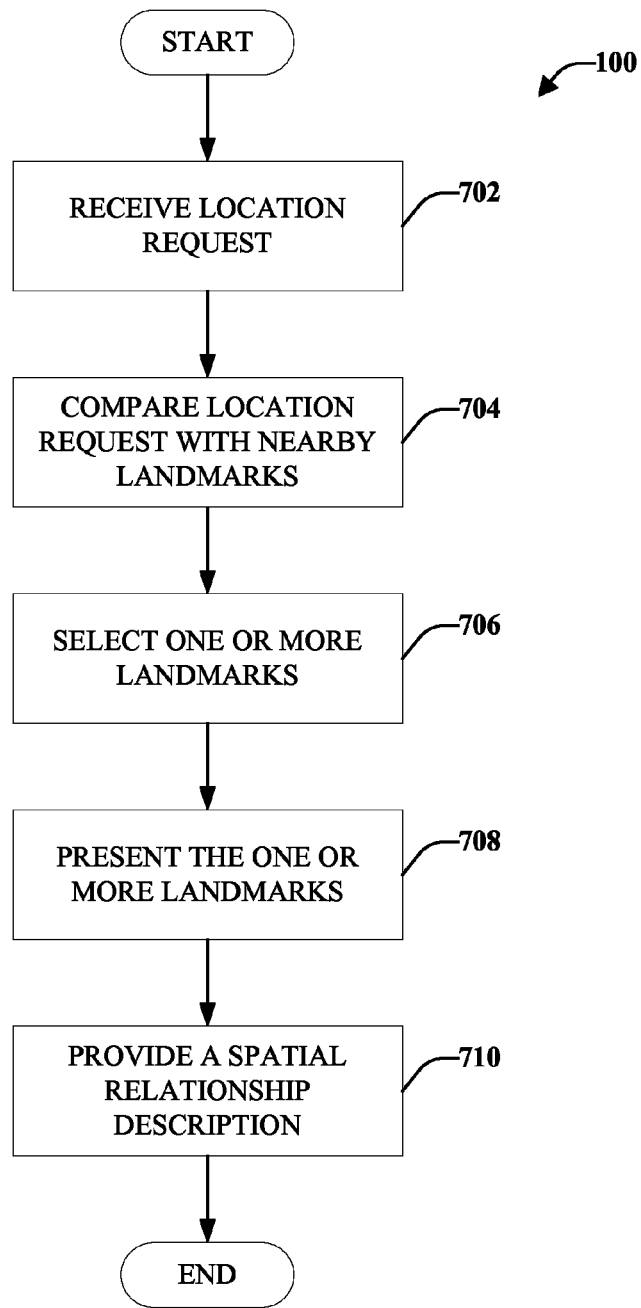
FIG. 7 illustrates a method for converting an address into a textual description based on one or more nearby landmarks.
Figure 8:
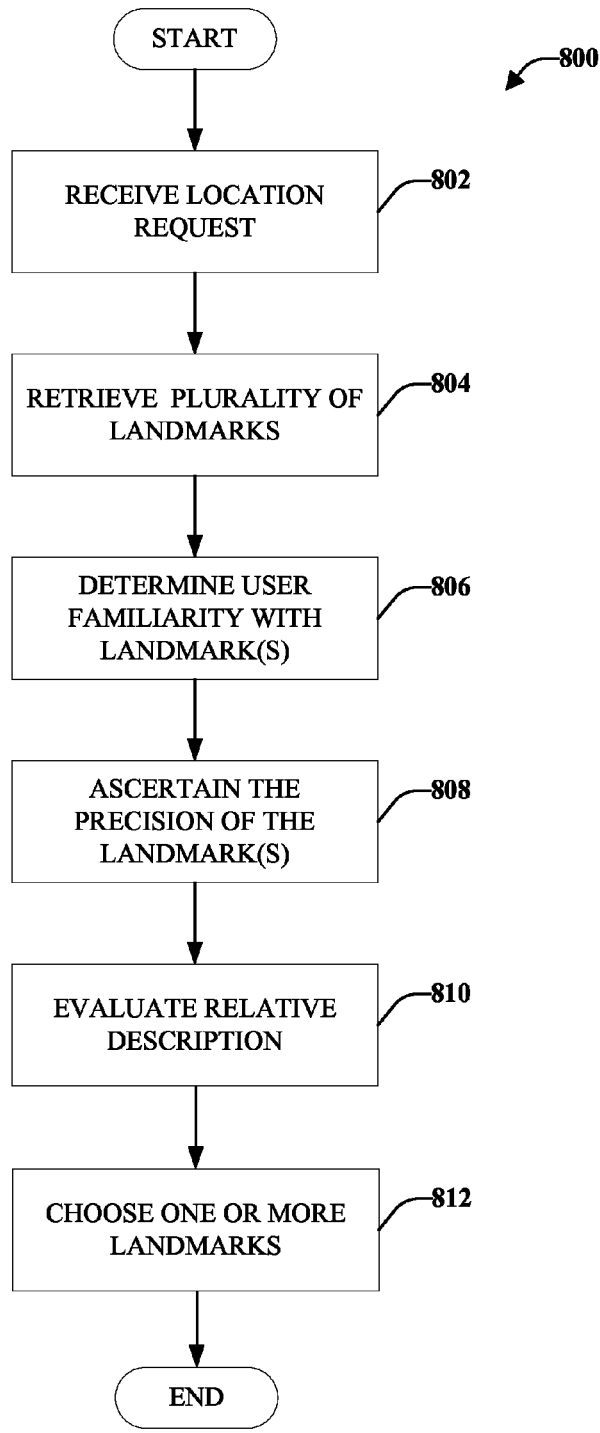
FIG. 8 illustrates a method for choosing one or more landmarks for use as a location description.

In view of the exemplary systems shown and described above, methodologies that may be implemented in accordance with the disclosed subject matter, will be better appreciated with reference to the flow charts of FIGS. 7 and 8. While, for purposes of simplicity of explanation, the methodologies are shown and described as a series of blocks, it is to be understood and appreciated that the disclosed aspects are not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g., device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 7 illustrates a method 700 for converting an address into a textual description based on one or more nearby landmarks. Method 700 can be configured to convert an address or GPS location into a description based on nearby landmarks and is related to the area of map-navigation. Originally, a landmark referred to a geographic feature used by explorers and others to find their way back from or through an area. In modern usage, a landmark is anything that is easily recognizable, such as a monument, building or other structure. In American English, "landmark" is the main term used to designate places that might be of interest to tourists due to notable physical features or historical significance, even if it is only well-known locally.

Although landmarks are an integral aspect of navigation, they have rarely been used within electronic navigation aids. Electronic navigation means for a mobile device or other devices can guide the user along a route using photographs of landmarks, together with audio and text instructions that reference these landmarks. This can assist older users who often find their mobility hampered by declines in sensory, cognitive and motor abilities.

Method 700 starts at 702, when a request to provide a target location of an address is received. The request can be received in various formats, such as a text entry, a spoken input, a selection on a map and so forth. The request can be converted to a spatial coordinate, if needed (e.g., not input or requested in this format). At 704, the location request is compared to a multitude of nearby landmarks. The nearby landmarks can be contained within a landmark database that can be pre-populated with landmarks and other descriptive features.

At 706, one or more of the multitude of nearby landmarks are selected. The selection can be made based on the user's familiarity with the area, a complexity of spatial relation of the landmark with respect to the location, the precision of the landmark, or combinations thereof. At 708, the one or more nearby landmarks are presented to the user in any perceivable format in response to the location request. A description of the spatial relationship between the nearby landmark and the target location is returned or presented, at 710.

FIG. 8 illustrates a method 800 for choosing one or more landmarks for use as a location description. Some landmarks can be very large, such as "South of Kansas" or it can be something very specific. Landmarks can also occupy a surface, a line, and a dot. This is a relative definition because, for example, the Space Needle occupies a certain amount of space. If two people want to meet at Space Needle, it might not be accurate enough because it does not explain whether one person will be inside or outside or on what side of the building the people will meet.

Another factor is how prominent a landmark is as it relates to a number of people. In some situations, if a landmark is larger it might be better known but it might be less precise. To return a location description it should be as precise as possible and that users know the landmark. Thus, a perfect landmark is precise and commonly known.

Method 800 starts, at 802, when a request for a target location is received and, at 804, a multitude of landmarks are retrieved based on the target location requested. At 806, a determination is made as to the user's familiarity with the landmark. This can be based on information previously received by the user, such as answers to specific questions presented to the user. This can also be based on default assumptions determined from a phone number of area code from which the request was received. In some aspects, the assumption can be based on the general population of where the target location is and a number of landmarks can be referenced.

At 808, the precision of the landmark is determined. This can be based on the area occupied by the landmark. An interstate might be a good landmark, but it might be too long to use as a description. At 810, the relative description between the landmark and the target location is evaluated. One block north is a good description, however, two miles north of Lake Union is not a good description because the user might not know where Lake Union is located or might not be able to distinguish it from other lakes.

At 812, one or more landmarks are chosen to be presented to the user. The landmarks can be presented as a cascading set of descriptions, all of which might vary in vagueness. This does not mean that a vague description is not an adequate description. Thus, if three lines are to be used to provide a location of a library, the three lines might have different qualities. The first line might be a landmark that is generally understood but which is vague. The next line can be a landmark at a medium level of understanding and more precise and the third line can be very precise. Thus, each of the descriptions can vary in levels of understanding and precision to provide the amount of detail that would be most beneficial to the user.

Figure 9:
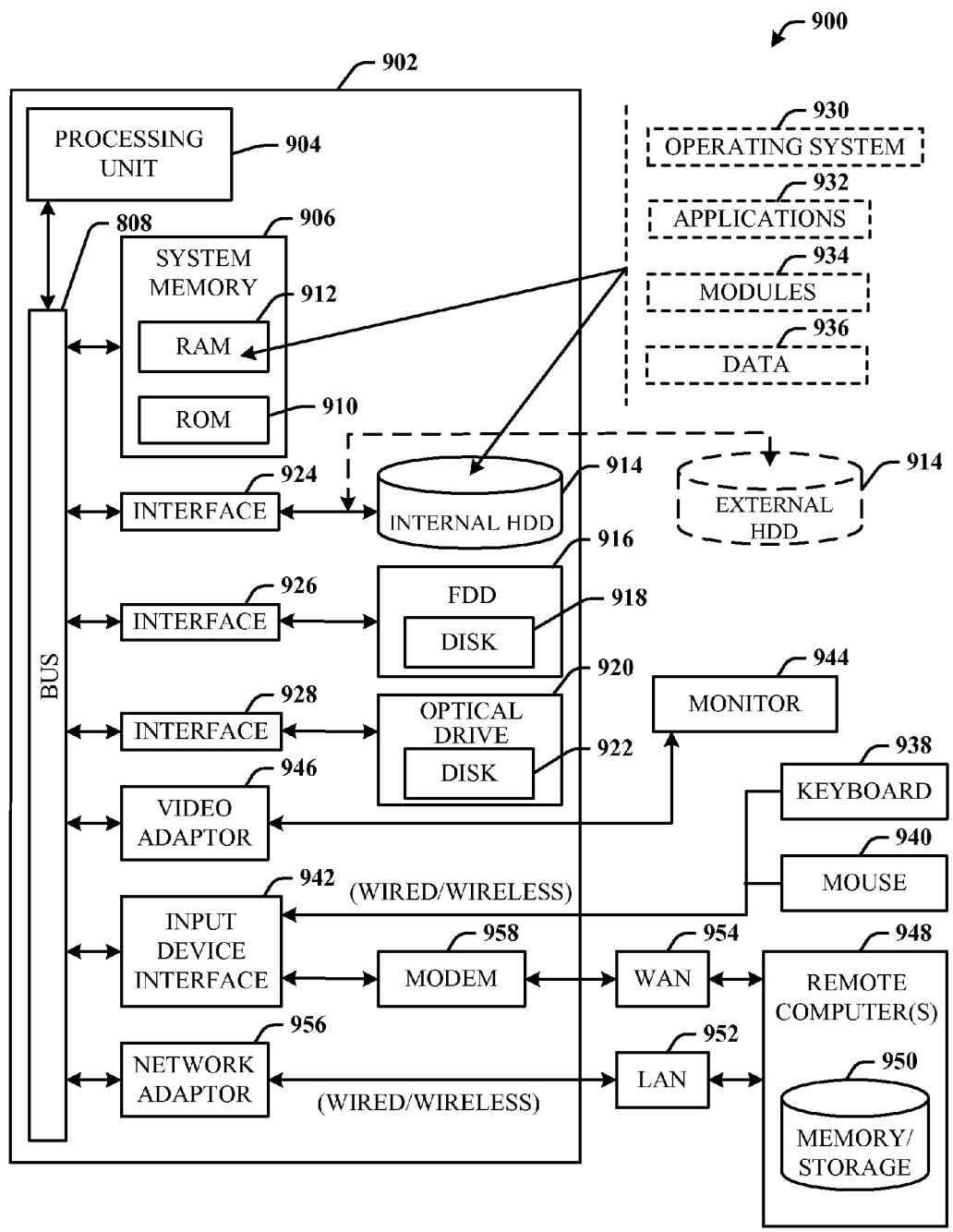
FIG. 9 illustrates a block diagram of a computer operable to execute the disclosed embodiments.

Referring now to FIG. 9, there is illustrated a block diagram of a computer operable to execute the disclosed architecture. In order to provide additional context for various aspects disclosed herein, FIG. 9 and the following discussion are intended to provide a brief, general description of a suitable computing environment 900 in which the various aspects can be implemented. While the one or more aspects have been described above in the general context of computer-executable instructions that may run on one or more computers, those skilled in the art will recognize that the various aspects also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the one or more aspects.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the various aspects can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 through an interface, such as a video adapter 946. In addition to the monitor 944, a computer typically includes other peripheral output devices (not shown), such as speakers, printers, etc.

The computer 902 may operate in a networked environment using logical connections through wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 through the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
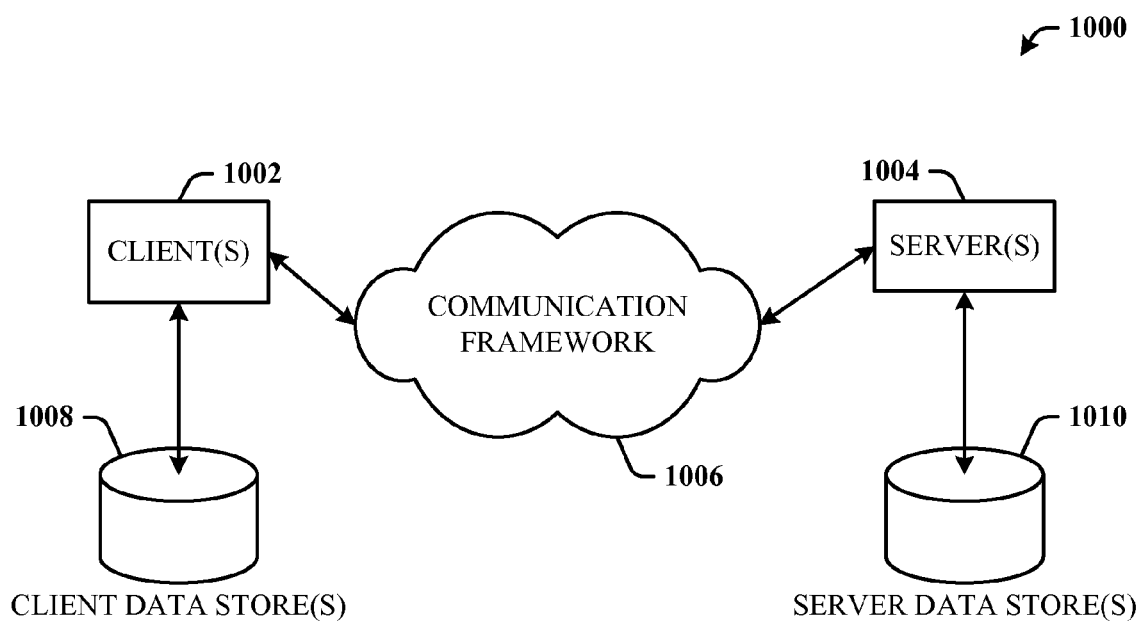
FIG. 10 illustrates a schematic block diagram of an exemplary computing environment operable to execute the disclosed embodiments.

Referring now to FIG. 10, there is illustrated a schematic block diagram of an exemplary computing environment 1000 in accordance with the various aspects. The system 1000 includes one or more client(s) 1002. The client(s) 1002 can be hardware and/or software (e.g., threads, processes, computing devices). The client(s) 1002 can house cookie(s) and/or associated contextual information by employing the various aspects, for example.

The system 1000 also includes one or more server(s) 1004. The server(s) 1004 can also be hardware and/or software (e.g., threads, processes, computing devices). The servers 1004 can house threads to perform transformations by employing the various aspects, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated through a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." The term "or" as used in either the detailed description of the claims is meant to be a "non-exclusive or".

The word "exemplary" as used herein to mean serving as an example, instance, or illustration. Any aspect or design described herein as "exemplary" is not necessarily to be construed as preferred or advantageous over other aspects or designs.

Furthermore, the one or more aspects may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

What is claimed is:

1. A method implemented by at least one computing device for converting an address into a textual description based at least in part on a nearby landmark, the method comprising:
   receiving, by the at least one computing device, a request to provide a target location of an address;
   comparing the location request with a plurality of nearby landmarks;
   selecting at least one of the plurality of nearby landmarks based at least in part on a user familiarity and a popularity as measured by a total number of users that are aware of the at least one of the plurality of nearby landmarks;
   presenting the at least one nearby landmark in response to the location request; and
   returning, by the at least one computing device, a description of a spatial relationship between the at least one nearby landmark and the target location.

2. The method of claim 1 further comprising, describing the spatial relationship between the at least one nearby landmark and a second landmark.

3. The method of claim 1, wherein selecting at least one of the plurality of nearby landmarks comprises:
   comparing at least two nearby landmarks included in the plurality of nearby landmarks; and
   choosing one of the at least two nearby landmarks based at least in part on a distance between the chosen landmark and the target location.

4. The method of claim 1, wherein selecting at least one of the plurality of nearby landmarks is a function of a precision of the at least one landmark.

5. The method of claim 1, wherein selecting at least one of the plurality of nearby landmarks is based at least in part on an impact radius.

6. The method of claim 1, wherein selecting at least one of the plurality of nearby landmarks is further based at least in part on a precision of the landmark, a spatial relationship of the landmark compared to the target location, or combinations thereof.

7. The method of claim 1, wherein the spatial relationship is one of a proximity relationship, an imaginary intersection, an extrapolation, or combinations thereof.

8. The method of claim 1, wherein the request comprises a text entry or a speech entry, or combinations thereof.

9. The method of claim 1, wherein the user familiarity is determined at least in part by comparing information from a user profile database and information from a landmark database.

10. A system, comprising:
    one or more processors; and
    memory, communicatively coupled to the one or more processors, storing a component configured to:
      receive a location request;
      associate the location request with a plurality of nearby landmarks;
      choose at least two of the plurality of nearby landmarks based at least in part on a user familiarity and a popularity as measured by a total number of users that are aware of the at least two of the plurality of nearby landmarks; and
      render at least a first nearby landmark and a second nearby landmark of the at least two chosen nearby landmarks, and a description of a spatial relationship of the target location relative to at least the first nearby landmark and the second nearby landmark.

11. The system of claim 10, wherein the component is further configured to:
    determine nearby landmarks of the plurality of nearby landmarks of which users are aware; and
    select a nearby landmark of the plurality of the landmarks of which more other users are aware than others of the plurality of nearby landmarks.

12. One or more computer-readable storage memories encoded with computer-executable instructions that, when executed by one or more processors, perform acts comprising:
    receiving a request to provide a target location of an address;
    comparing the location request with a plurality of nearby landmarks;
    selecting at least one of the plurality of nearby landmarks based at least in part on a user familiarity and a percentage of users that are aware of the at least one of the plurality of nearby landmarks;
    presenting the at least one nearby landmark in response to the location request; and
    returning a description of a spatial relationship between the at least one nearby landmark and the target location.

13. The one or more computer-readable storage memories of claim 12, wherein the acts further comprise describing the spatial relationship between the at least one nearby landmark and a second landmark.

14. The one or more computer-readable storage memories of claim 12, wherein selecting at least one of the plurality of nearby landmarks comprises:
    comparing at least two nearby landmarks included in the plurality of nearby landmarks; and
    choosing one of the at least two nearby landmarks based at least in part on a distance between the landmark and the target location.

15. The one or more computer-readable storage memories of claim 12, wherein selecting at least one of the plurality of nearby landmarks is a function of a precision of the at least one landmark.

16. The one or more computer-readable storage memories of claim 12, wherein selecting at least one of the plurality of nearby landmarks is based at least in part on an impact radius.

17. The one or more computer-readable storage memories of claim 12, wherein selecting at least one of the plurality of nearby landmarks is further based on a precision of the landmark, a spatial relationship of the landmark compared to the target location, or combinations thereof.

18. The one or more computer-readable storage memories of claim 12, wherein the at least one nearby landmark includes a first nearby landmark and a second nearby landmark, and the description of the spatial relationship includes at least one of a proximity relationship that expresses the target location between the first nearby landmark and the second nearby landmark, an imaginary intersection, an extrapolation that expresses the target location on a line formed between the first nearby landmark and the second nearby landmark, or combinations thereof.

19. The one or more computer-readable storage memories of claim 12, wherein the request comprises a text entry or a speech entry, or combinations thereof.

20. The one or more computer-readable storage memories of claim 12, wherein the user familiarity is further determined by comparing information from a user profile database and information from a landmark database.

\* \* \* \* \*